US009008857B2

(12) United States Patent
Kim et al.

(10) Patent No.: US 9,008,857 B2
(45) Date of Patent: Apr. 14, 2015

(54) SYSTEM AND METHOD OF DETECTING DROWSY DRIVING

(71) Applicant: Hyundai Motor Company, Seoul (KR)

(72) Inventors: Jinkwon Kim, Gyeonggi-Do (KR);
Byoung Joon Lee, Gyeonggi-Do (KR);
Ho Choul Jung, Gyeonggi-Do (KR);
Samyong Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/099,240

(22) Filed: Dec. 6, 2013

(65) Prior Publication Data

US 2014/0180496 A1    Jun. 26, 2014

(30) Foreign Application Priority Data

Dec. 26, 2012    (KR) .................. 10-2012-0153735

(51) Int. Cl.
*G06F 17/00*     (2006.01)
*B60R 99/00*     (2009.01)

(52) U.S. Cl.
CPC .................................... *B60R 99/00* (2013.01)

(58) Field of Classification Search
CPC .. B60K 28/06; B60K 28/006; G01C 21/3697; A61B 5/0205; A61B 5/0476
USPC ......... 701/1, 36; 340/438, 439, 575, 576, 937
See application file for complete search history.

(56) References Cited

U.S. PATENT DOCUMENTS

| | | | | |
|---|---|---|---|---|
| 7,719,431 B2 * | 5/2010 | Bolourchi | ...................... | 340/576 |
| 8,108,098 B2 * | 1/2012 | Childress et al. | ............... | 701/36 |
| 8,179,243 B2 * | 5/2012 | Chen et al. | ..................... | 340/438 |
| 8,253,551 B2 * | 8/2012 | Tsai | ............................... | 340/439 |
| 8,587,649 B2 * | 11/2013 | Lo et al. | ........................ | 348/119 |
| 8,698,639 B2 * | 4/2014 | Fung et al. | .................... | 340/576 |
| 8,717,197 B2 * | 5/2014 | Rathmacher et al. | ......... | 340/937 |

FOREIGN PATENT DOCUMENTS

| | | |
|---|---|---|
| JP | 05-262162 | 10/1993 |
| JP | 2000-355230 | 12/2000 |
| KR | 10-2004-0008393 | 1/2004 |

OTHER PUBLICATIONS

Kim et al., Detecting Driver Fatigue based on the Driver's Response Pattern and the Front View Environment of an Automobile, 2008, IEEE, p. 237-240.*

Karaduman et al., Approaching Car Detection via Clustering of Vertical-Horizontal Line Scanning Optical Edge Flow, 2012, IEEE, p. 502-507.*

* cited by examiner

*Primary Examiner* — McDieunel Marc
(74) *Attorney, Agent, or Firm* — Mintz Levin Cohn Ferris Glovsky and Popeo, P.C.; Peter F. Corless (57) ABSTRACT

A system and method of detecting drowsy driving that include a controller configured to calculate basic characteristics based on steering torque information and lateral displacement information for every first time and basic thresholds based on the basic characteristics for a second time. In addition, the controller calculates a current characteristic based on the steering torque information and the lateral displacement information for every third time and calculates current thresholds based on the current characteristic for a fourth time. The controller then compares the current thresholds and the current characteristics to determine whether drowsy driving is generated.

17 Claims, 5 Drawing Sheets

SYSTEM AND METHOD OF DETECTING DROWSY DRIVING

CROSS-REFERENCE TO RELATED APPLICATION

This application claims priority to and the benefit of Korean Patent Application No. 10-2012-0153755 filed in the Korean Intellectual Property Office on Dec. 26, 2012, the entire contents of which are incorporated herein by reference.

BACKGROUND (a) Field of the Invention

The present invention relates to a system and method of detecting drowsy driving, and more particularly, to a system and method of detecting drowsy driving based on a steering torque from among a plurality of driving patterns.

(b) Description of the Related Art

Drowsy driving is a cause of four out of ten expressway traffic accidents, thus, a system that prevents traffic accidents due to drowsy driving is necessary.

A system has been recently developed for monitoring a state of a driver and the system generally evaluates a state of the driver by analyzing a driving pattern, an image of the driver, and a bio-signal. In addition, a system for detecting drowsy driving based on the driving pattern may be advantageously implemented only with control area network (CAN) data without using an imaging device (e.g., a camera) or an additional sensor.

A technology of detecting drowsy driving based on a driving pattern evaluates a state of a driver using various signals obtained within a vehicle such as a steering angle, lateral displacement, a vehicle speed, and the like, and a driving characteristic, based on which a stale of a driver may be inferred, is detected by combining those signals.

The most widely used characteristic in the related art is a steering angle dead-band. The steering angle dead-band refers to a steering pattern in which a steering angle is maintained at approximately 0 degrees for a predetermined period of time and then is rapidly changed. When a driver drives while drowsy, the driver maintains a steering angle of approximately 0 degrees for a predetermined period of time and then suddenly steers the vehicle while waking up, so that the steering angle dead-band is used as a characteristic of drowsy driving.

However, when the drowsy driving is determined based on the steering angle dead-band, since a change in a steering angle is substantially small during normal (e.g., when no sudden steering movements are experienced) driving while monotonous high-speed driving which is an operation condition of most detection logics of drowsy driving, it is impossible to estimate when the driver becomes drowsy even though no change in a steering angle is experienced.

Further, since a rapidly changed steering pattern is experienced after dangerous drowsy driving, the rapidly changed steering pattern is insufficient for the purpose of preliminary warning of the detection logic of the drowsy driving. Further, in many cases, when a driver wakes up, when a situation is not dangerous, there is no rapidly changed steering, and thus, the steering angle dead-band is not generated.

Accordingly, the existing steering angle dead-band characteristic has a disadvantage in that drowsy driving is detected after a dangerous situation is already generated, and it may be difficult to distinguish between general drowsy driving and normal driving.

The above information disclosed in this section is only for enhancement of understanding of the background of the invention and therefore it may contain information that does not form the prior art that is already known in this country to a person of ordinary skill in the art.

SUMMARY

The present invention provides a system and method of detecting drowsy driving, which detects whether drowsy driving is generated based on a steering torque.

An exemplary embodiment of the present invention provides a method of detecting drowsy driving, including: a learning step of calculating basic characteristics based on steering torque information and lateral displacement information for every first time, and calculating basic thresholds based on the basic characteristics for a second time; and an evaluation step of calculating a current characteristic based on the steering torque information and the lateral displacement information for every third time, calculating current thresholds based on the current characteristic for a fourth time, and comparing the current thresholds and the current characteristic to determine whether drowsy driving is generated.

The first time may be substantially the same as the third time. The basic characteristic and the current characteristic may be any one of limitation of a range of a maximum value and a minimum value of the information, evaluation of an inclination, and analysis of a frequency. The thresholds may satisfy the Equations below.

$$Th_{torque} = f_{current}(x_{torque}) + a * C_{torque}$$

$$Th_{offset} = f_{current}(x_{offset}) + \beta * C_{offset}$$

wherein, $x_{torque}$ may be defined as a current characteristic of the steering torque, $x_{offset}$ may be defined as a current characteristic of the lateral displacement variance, $f_{current}(x_{torque})$ is a mean value of $x_{torque}$, $f_{current}(x_{offset})$ is a mean value of $x_{offset}$, $a$ and $\beta$ are constant values, and $C_{torque}$ and $C_{offset}$ are defined as standard deviation.

$Th_{torque}$ and $Th_{offset}$ of the current thresholds may be defined as basic thresholds. The second time may be about twenty minutes and the fourth time may be about two minutes.

The evaluation step may include calculating the number of incidents that the current characteristic value for the fourth time is greater than the current threshold. In addition, the evaluation step may include determining that when the current characteristic value that is greater than the current threshold, is equal to or greater than 5 drowsy driving is occurring.

According to the exemplary embodiment, the drowsy driving may be determined by utilizing a change in a steering torque and a lateral displacement signal during drowsy driving, and thus it may be possible to improve accuracy of drowsy driving detection during high-speed driving, compared to the method of determining drowsy driving based on a steering angle in the related art.

Further, since a drowsy driving detection system based on a steering angle dead-band in the related art may detect drowsy driving only when a substantial change in steering occurs, the drowsy driving detection system presents a warning only when a dangerous drowsy driving situation has already occurred, thus deteriorating the effectiveness of the system. In the meantime, according to the present invention, it may be possible to detect a phenomenon, in which a change in a steering torque is decreased due to a decrease in grasping power due to drowsing, based on a steering torque dead-band, without detecting changed steering, thereby rapidly presenting a warning and achieving increased effectiveness in accident prevention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Throughout the specification, unless explicitly described to the contrary, the word "comprise" and variations such as "comprises" or "comprising," will he understood to imply the inclusion of stated elements but not the exclusion of any other elements.

Figure 1:
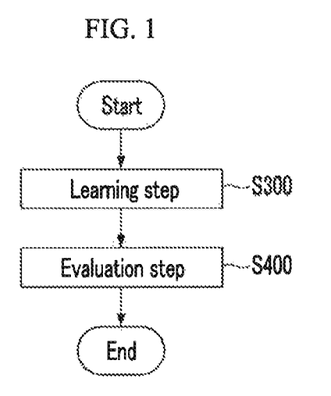
FIG. 1 is an exemplary flowchart illustrating a method of detecting drowsy driving according to an exemplary embodiment of the present invention.
Figure 2A:
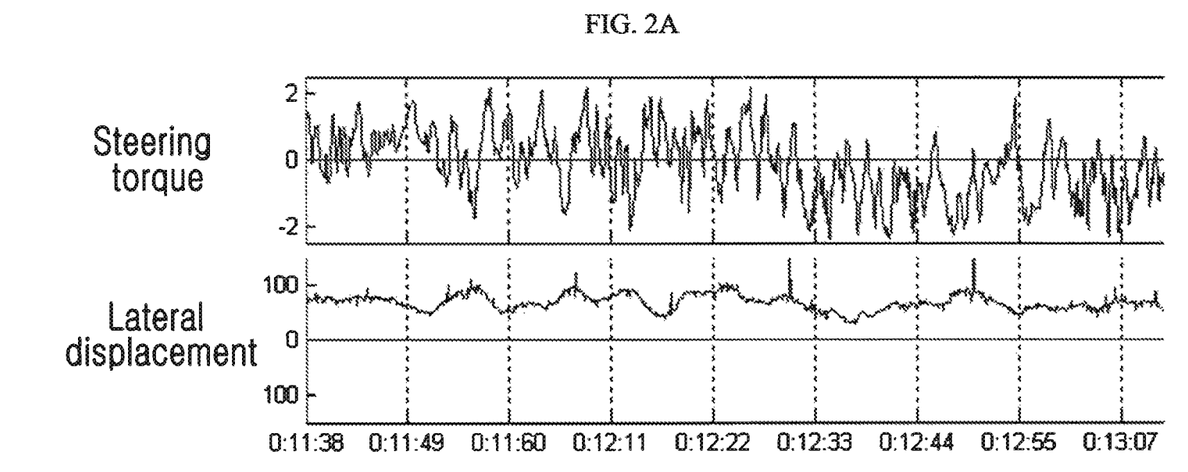
FIGS. 2A and 2B are exemplary graphs illustrating a change in a steering torque of FIG. 1 according to an exemplary embodiment of the present invention.
Figure 2B:
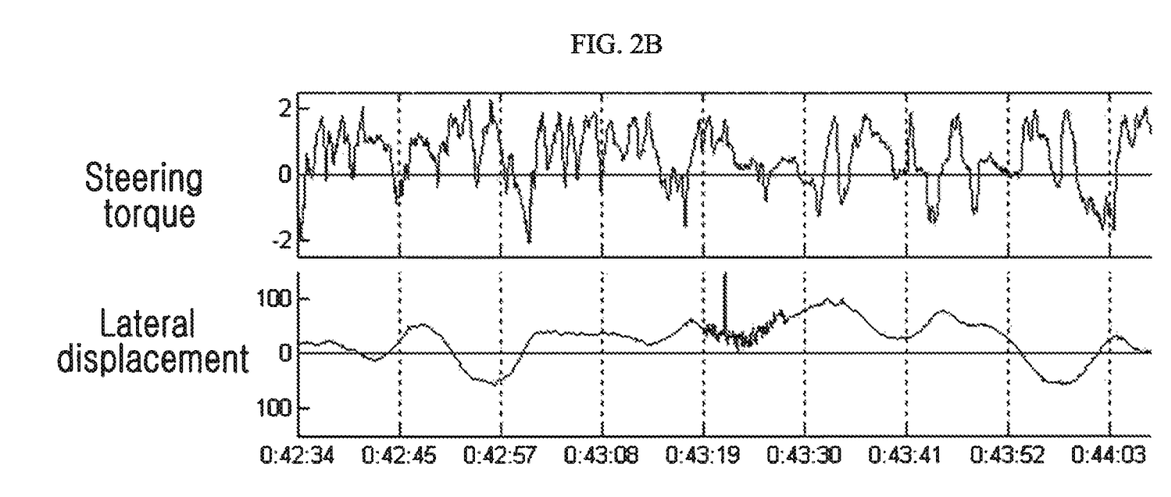
Figure 3:
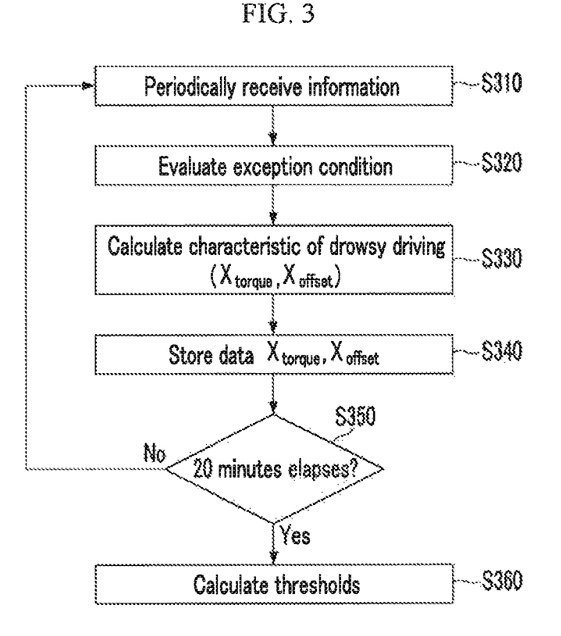
FIG. 3 is an exemplary flowchart illustrating a step of setting initial thresholds of FIG. 1 according to an exemplary embodiment of the present invention.
Figure 4:
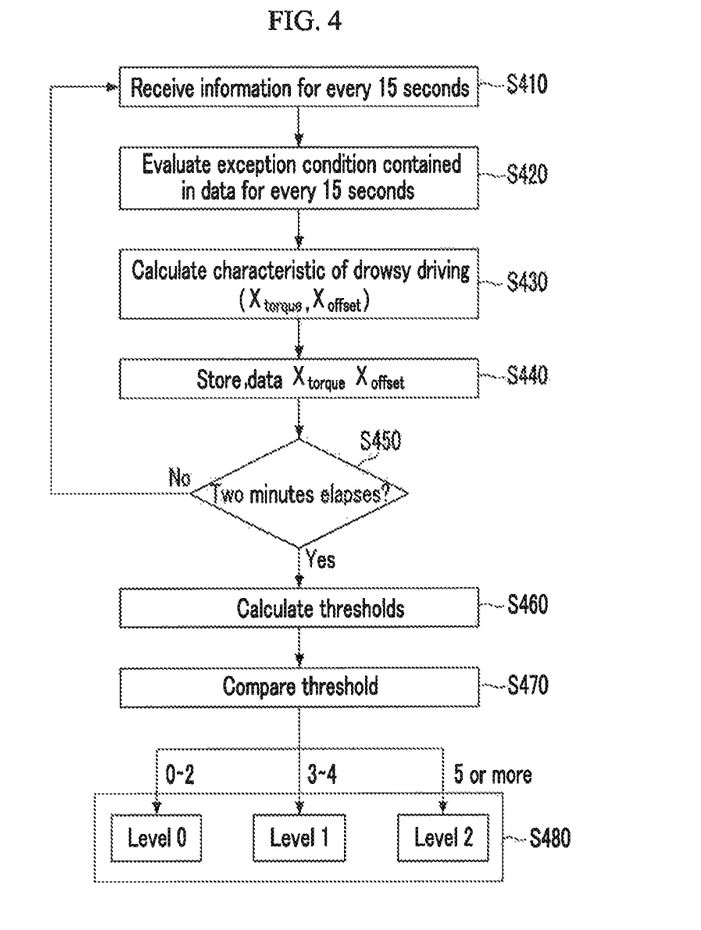
FIG. 4 is an exemplary flowchart illustrating a step of periodically calculating and evaluating thresholds of FIG. 1 according to an exemplary embodiment of the present invention.

FIG. 1 is an exemplary flowchart illustrating a method of detecting drowsy driving according to an exemplary embodiment of the present invention, FIG. 2 is an exemplary graph illustrating a change in a steering torque of FIG. 1, FIG. 3 is an exemplary flowchart illustrating a step of setting initial thresholds of FIG. 1, and FIG. 4 is an exemplary flowchart illustrating a step of periodically calculating and evaluating thresholds of FIG. 1.

During a monotonous high-speed driving that is an operation condition of most drowsy driving detection logics, a steering wheel angle may be substantially small (e.g., maintained at approximately 0°), and thus a change in a steering angle is similarly small in both drowsy driving and normal driving. Further, when the steering angle represents an on-center section (e.g., about −6° to 6°), a substantially small steering torque signal does not influence the steering angle, and thus a difference between the normal driving and the drowsy driving is not significant.

In the meantime, a change at the on-center section may be detected based on a torque, and thus, the normal driving and the drowsy driving may be more accurately distinguished based on the torque. According to the exemplary embodiment of the present invention, drowsy driving may be determined based on low steering three, that is, a substantially low steering torque, and a lateral displacement variance increase due to a low steering intention, The steering torque may be determined with a steering column torque signal of a motor driven power steering system (MDPS), and the lateral displacement variance increase may be determined with a vertical offset signal of a lane departure warning system (LDWS).

Hereinafter, the present invention will be described with reference to FIGS. 1 to 4.

First, a controller may be configured to receive information regarding a steering torque, lateral displacement, and a vehicle speed. Referring to FIGS. 2A and 2B, FIG. 2A illustrates data that represents a steering torque and lateral displacement during normal driving, and FIG. 2B illustrates data that represents a steering torque and lateral displacement during drowsy driving.

FIGS. 2A and 2B show that the steering torque may change rapidly and minimal lateral displacement variance may be generated during the normal driving. Additionally, FIGS. 2A and 2B show that the steering torque changes slowly and increased lateral displacement variance is generated during the drowsy driving. The steering torque or the lateral displacement may be filtered to decrease a noise.

The controller may first be configured to perform a learning step of receiving the information, and calculating each threshold based on the received information (S300).

Referring to FIG. 3, when a driver performs a logic for the method of detecting the drowsy driving during driving, the controller may be configured to receive information regarding the steering torque, the lateral displacement, and the vehicle speed for every first time, for example, every 15 seconds (S310). The time of 15 seconds may be arbitrarily set by a person of ordinary skill in the art.

Next, the controller may be configured to determine whether an exception condition is contained in the information (S320). The exception condition may be when a lane is changed, the lateral displacement is not detected for 0.5 second or longer, a speed equal to or less than 60 km/h is maintained for 0.5 second or longer, the driver takes the hands off the steering wheel for 0.5 second or longer, or the like, The exception condition may be arbitrarily set. When it is determined that an exception condition has occurred, the controller may be configured to determine that effective data is not input, and may be configured to not perform calculation until next information is received. In other words, the exception condition may exist when a slow change in the steering torque is frequently generated regardless of drowsy driving or when the lateral displacement variance is increased regardless of drowsy driving.

Furthermore, when the controller determines that the information is effective, the controller may be configured to calculate a characteristic (S330). In particular, the controller may be configured to extract a steering torque dead-band $x_{torque}$ and the lateral displacement variance $x_{offset}$ as the characteristic. The steering torque dead-band $x_{torque}$, which is used for detecting a slowly moving steering torque during the drowsy driving, may be different from that of the normal driving as illustrated in FIGS. 2A and 2B, may be implemented by limiting a range of a maximum value and a minimum value of the signal, evaluating an inclination, or analyzing a frequency.

A driving pattern that has the difference illustrated in FIGS. 2A and 2B may be detected by using the characteristics of the steering torque dead-band $x_{torque}$ and the lateral displacement variance $x_{offset}$. In the learning step, the controller may be configured to store the characteristics of the steering torque dead-band $x_{torque}$ and the lateral displacement variance $x_{offset}$ for every 15 seconds (S340).

When a predetermined time (e.g., second time) elapses after the driver performs the logic (S350), the controller may be configured to calculate thresholds $Th_{torque}$ and $Th_{offset}$ for a plurality of stored characteristics of the steering torque dead-band $x_{torque}$ and the lateral displacement variance $x_{offset}$ (S360). The predetermined time (e.g., the second time) may be set as 20 minutes. The thresholds $Th_{torque}$ and $Th_{offset}$ may be calculated by the Equations below.

$$Th_{torque} = f_{current}(x_{torque}) + a * C_{torque} \qquad \text{Equation 1}$$

$$Th_{offset} = f_{current}(x_{offset}) + \beta * C_{offset} \qquad \text{Equation 1}$$

wherein, $x_{torque}$ is defined as a current characteristic of the steering torque, $x_{offset}$ is defined as a current characteristic of the lateral displacement variance, $f_{current}(x_{torque})$ is a mean value of $x_{torque}$, $f_{current}(x_{offset})$ is a mean value of $x_{offset}$, a and β are constant values, and $C_{torque}$ and $C_{offset}$ are defined as standard deviation, $Th_{torque}$ and $Th_{offset}$ of the current thresholds may be defined as basic thresholds.

As described above, when each of the thresholds $Th_{torque}$ and $Th_{offset}$ is calculated in the learning step, the learning step may be completed and the process may be switched to an evaluation step (S400).

When the evaluation step begins, the controller may be configured to receive the information on the steering torque, the lateral displacement, and the vehicle speed for every third time, for example, every 15 seconds (S410). The time of 15 seconds may he arbitrarily set by a person of ordinary skill in the art.

Next, the controller may be configured to determine whether the exception condition is contained in the information (S420). The exception condition may occur when a lane is changed, the lateral displacement is not detected for 0.5 second or longer, a speed equal to or less than 60 km/h is maintained for 0.5 second or longer, the driver takes the hands off the steering wheel for 0.5 second or longer, or the like.

Furthermore, when the controller determines that the information is effective, the controller may be configured to calculate the characteristic (S430). In particular, the controller may be configured to extract the steering torque dead-band $x_{torque}$ and the lateral displacement variance $x_{offset}$ as the characteristic. A driving pattern that has the difference illustrated in FIGS. 2A and 2B may be detected using the characteristics of the steering torque dead $x_{torque}$ and the lateral displacement variance $x_{offset}$.

In the evaluation step, the controller may be configured to store the characteristics of the steering torque dead-band $x_{torque}$ and the lateral displacement variance $x_{offset}$ for every 15 seconds (S440).

When a predetermined time (e.g., a fourth time) elapses after the driver performs the evaluation step (S450), the controller may be configured to calculate thresholds $Th_{torque}$ and $Th_{offset}$ for a plurality of stored characteristics of the steering torque dead-band $x_{torque}$ and the lateral displacement variance $x_{offset}$ (S460). The predetermined time (e.g., the fourth time) may be set as 2 minutes.

The thresholds $Th_{torque}$ and $Th_{offset}$ may be obtained by Equations below.

Equation 1

$$Th_{torque} = f_{current}(x_{torque}) + a * C_{torque}$$

$$Th_{offset} = f_{current}(x_{offset}) + \beta * C_{offset} \qquad \text{Equation 1}$$

wherein, $x_{torque}$ is defined as a current characteristic of the steering torque, $x_{offset}$ is defined as a current characteristic of the lateral displacement variance, $f_{current}(x_{torque})$ is a mean value of $x_{torques}$, $f_{current}(x_{offset})$ is a mean value of $x_{offset}$, a and β are constant values, and $C_{torque}$ and $C_{offset}$ are defined as standard deviation. $Th_{torque}$ and $Th_{offset}$ of the current thresholds may be defined as basic thresholds.

Additionally, the controller may be configured to compare the calculated thresholds $Th_{torque}$ and $Th_{offset}$ (S470). In other words, the controller may be configured to determine the number of occurrences that the characteristic values are equal to or greater than the thresholds $Th_{torque}$ and $Th_{offset}$ by comparing the characteristic values for eight times for the recent 2 minutes and the thresholds $Th_{torque}$ and $Th_{offset}$ for the characteristic values, respectively. In particular, when the counted value is equal to or less than 2, the occurrence may be defined as level 0, when the counted value is 3 and 4, the occurrence may be defined as level 1, and when the counted value is 5 or greater, the occurrence may be defined as level 2, which may be arbitrarily set (S480).

When level 0 is determined as the normal driving, level 1 may be determined as fatigue driving, and level 2 may be determined as the drowsy driving, When the drowsy driving is determined as described above, the controller may be configured to notify the driver of the drowsy driving via an alarm, and the like, to allow the driver to immediately respond to the drowsy driving.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A method of detecting drowsy driving, comprising:
calculating, by a controller, basic characteristics based on steering torque information and lateral displacement information for every first time;
calculating, by the controller, basic thresholds based on the basic characteristics for a second time;
calculating, by the controller, a current characteristic based on the steering torque information and the lateral displacement information for every third time;
calculating, by the controller, current thresholds based on the current characteristics for a fourth time; and
comparing, by the controller, the current thresholds and the current characteristics to determine whether drowsy driving is generated,
wherein the basic characteristic and the current characteristic are any one of a limitation of a range of a maximum value and a minimum value of the information, evaluation of an inclination, and analysis of a frequency.

2. The method of claim 1, wherein the first time is the same as the third time.

3. The method of claim 1, wherein the thresholds are calculated using the following equation:

$$Th_{torque} = f_{current}(x_{torque}) + a*C_{torque}$$

$$Th_{offset} = f_{current}(x_{offset}) + \beta*C_{offset}$$

wherein, $x_{torque}$ is a current characteristic of the steering torque, $x_{offset}$ is a current characteristic of the lateral displacement variance, $f_{current}(x_{torque})$ is a mean value of $x_{torque}$, $f_{current}(x_{offset})$ is a mean value of $x_{offset}$, a and $\beta$ are constant values, and $C_{torque}$ and $C_{offset}$ are standard deviation.

4. The method of claim 3, wherein $Th_{torque}$ and $Th_{offset}$ of the current thresholds are basic thresholds.

5. The method of claim 1, wherein the second time is 20 minutes.

6. The method of claim 5, wherein the fourth time is 2 minutes.

7. The method of claim 1, wherein the method further includes:
determining, by the controller, the number of occurrences when the current characteristic value for the fourth time is greater than the current threshold.

8. The method of claim 7, wherein the method further includes:
determining, by the controller, drowsy driving when the number of occurrences when the current characteristic value is greater than the current threshold is equal to or greater than 5.

9. A system that detects drowsy driving, comprising:
a controller configured to:
calculate basic characteristics based on steering torque information and lateral displacement information for every first time;
calculate basic thresholds based on the basic characteristics for a second time;
calculate a current characteristic based on the steering torque information and the lateral displacement information for every third time;
calculate current thresholds based on the current characteristics for a fourth time; and
compare the current thresholds and the current characteristics to determine whether drowsy driving is generated,
wherein the basic characteristic and the current characteristic are any one of a limitation of a range of a maximum value and a minimum value of the information, evaluation of an inclination, and analysis of a frequency.

10. The system of claim 9, wherein the first time is the same as the third time.

11. The system of claim 9, wherein the thresholds are calculated using the following equation:

$$Th_{torque} = f_{current}(x_{torque}) + a*C_{torque}$$

$$Th_{offset} = f_{current}(x_{offset}) + \beta*C_{offset}$$

wherein, $x_{torque}$ is a current characteristic of the steering torque, $x_{offset}$ is a current characteristic of the lateral displacement variance, $f_{current}(x_{torque})$ is a mean value of $x_{torque}$, $f_{current}(x_{offset})$ is a mean value of $x_{offset}$, a and $\beta$ are constant values, and $C_{torque}$ and $C_{offset}$ are standard deviation.

12. The system of claim 11, wherein $Th_{torque}$ and $Th_{offse}$ of the current thresholds are basic thresholds.

13. The system of claim 9, wherein the controller is further configured to:
determine the number of occurrences when the current characteristic value for the fourth time is greater than the current threshold.

14. The system of claim 13, wherein the controller is further configured to:
determine drowsy driving when the number of occurrences when the current characteristic value is greater than the current threshold is equal to or greater than 5.

15. A non-transitory computer readable medium containing program instructions executed by a controller, the computer readable medium comprising:
program instructions that calculate basic characteristics based on steering torque information and lateral displacement information for every first time;
program instructions that calculate basic thresholds based on the basic characteristics for a second time;
program instructions that calculate a current characteristic based on the steering torque information and the lateral displacement information for every third time;
program instructions that calculate current thresholds based on the current characteristics for a fourth time; and
program instructions that compare the current thresholds and the current characteristics to determine whether drowsy driving is generated,
wherein the basic characteristic and the current characteristic are any one of a limitation of a range of a maximum value and a minimum value of the information, evaluation of an inclination, and analysis of a frequency.

16. The non-transitory computer readable medium of claim 15, wherein the first time is the same as the third time.

17. The non-transitory computer readable medium of claim 15, wherein the thresholds are calculated using the following equation:

$$Th_{torque} = f_{current}(x_{torque}) + a*C_{torque}$$

$$Th_{offset} = f_{current}(x_{offset}) + \beta*C_{offset}$$

wherein, $x_{torque}$ is a current characteristic of the steering torque, $x_{offset}$ is a current characteristic of the lateral displacement variance, $f_{current}(x_{torque})$ is a mean value of $x_{torque}$, $f_{current}(x_{offset})$ is a mean value of $x_{offset}$, a and β are constant values, and $C_{torque}$ and $C_{offset}$ are standard deviation.

* * * * *